US011019599B2

(12) United States Patent
Islam et al.

(10) Patent No.: US 11,019,599 B2
(45) Date of Patent: *May 25, 2021

(54) MONITORING OCCASION FOR PAGING DETERMINATION

(71) Applicant: QUALCOMM Incorporated, San Diego, CA (US)

(72) Inventors: Muhammad Nazmul Islam, Littleton, MA (US); Bilal Sadiq, Basking Ridge, NJ (US); Tao Luo, San Diego, CA (US); Makesh Pravin John Wilson, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/887,830

(22) Filed: May 29, 2020

(65) Prior Publication Data

US 2020/0296688 A1  Sep. 17, 2020

Related U.S. Application Data

(63) Continuation of application No. 16/242,791, filed on Jan. 8, 2019, now Pat. No. 10,721,712.

(Continued)

(51) Int. Cl.
*H04W 68/00* (2009.01)
*H04W 68/02* (2009.01)

(Continued)

(52) U.S. Cl.
CPC .......... *H04W 68/02* (2013.01); *H04L 5/0048* (2013.01); *H04L 5/0053* (2013.01); *H04W 24/08* (2013.01);

(Continued)

(58) Field of Classification Search
CPC ..... H04W 52/02; H04W 68/00; H04W 68/02; H04W 72/04; H04W 72/12
See application file for complete search history.

(56) References Cited

U.S. PATENT DOCUMENTS

2012/0300655 A1   11/2012   Lee et al.
2013/0301549 A1*  11/2013   Chen ............... H04W 52/0212
                                              370/329

(Continued)

FOREIGN PATENT DOCUMENTS

EP    2369883 A1      9/2011
WO    2008155739 A2   12/2008
WO    2016184401 A1   11/2016

OTHER PUBLICATIONS

International Search Report and Written Opinion—PCT/US2019/012906—ISA/EPO—dated Mar. 1, 2019.

(Continued)

*Primary Examiner* — Shantell L Heiber
(74) *Attorney, Agent, or Firm* — QUALCOMM Incorporated

(57) ABSTRACT

Various aspects of the present disclosure generally relate to wireless communication. In some aspects, a base station may determine, for a user equipment, a configuration for a monitoring occasion for paging within a paging occasion based at least in part on a user equipment index and a reference signal index. In some aspects, the base station may provide a paging signal in accordance with the configuration based at least in part on determining the configuration for the monitoring occasion for paging within the paging occasion. Numerous other aspects are provided.

31 Claims, 9 Drawing Sheets

Related U.S. Application Data

(60) Provisional application No. 62/616,863, filed on Jan. 12, 2018.

(51) Int. Cl.

| | | |
|---|---|---|
| *H04W 88/08* | (2009.01) | |
| *H04L 5/00* | (2006.01) | |
| *H04W 24/08* | (2009.01) | |
| *H04W 56/00* | (2009.01) | |
| *H04W 72/04* | (2009.01) | |
| *H04W 72/14* | (2009.01) | |
| *H04W 48/12* | (2009.01) | |

(52) U.S. Cl.
CPC ....... *H04W 56/001* (2013.01); *H04W 72/042* (2013.01); *H04W 72/14* (2013.01); *H04W 88/08* (2013.01); *H04L 5/0091* (2013.01); *H04W 48/12* (2013.01)

(56) References Cited

U.S. PATENT DOCUMENTS

| | | |
|---|---|---|
| 2016/0029344 A1 | 1/2016 | Vannithamby et al. |
| 2018/0192383 A1 | 7/2018 | Nam et al. |
| 2018/0199308 A1 | 7/2018 | Liu et al. |
| 2018/0199310 A1 | 7/2018 | Islam et al. |
| 2018/0220360 A1* | 8/2018 | Sheng ................... H04W 48/10 |
| 2018/0234826 A1 | 8/2018 | Määttanen et al. |
| 2018/0234919 A1 | 8/2018 | Tsuda et al. |
| 2018/0338281 A1 | 11/2018 | Bangolae et al. |
| 2019/0069271 A1* | 2/2019 | Reial ................... H04W 72/005 |
| 2019/0223150 A1 | 7/2019 | Islam et al. |

OTHER PUBLICATIONS

Nokia et al: "Determination of PF and PO in NR," 3GPP Draft; R2-1806931 Determination of PF and PO in NR, 3rd Generation Partnership Project (3GPP), Mobile Competence Centre; 650, Route Des Lucioles; F-06921 Sophia-Antipolis Cedex; France, vol. RAN WG2, No. Busan; May 21, 2018-Apr. 25, 2018, May 11, 2018, XP051464469, 4 pages, Retrieved from the Internet: URL: http://www.3gpp.org/ftp/tsg%5Fran/WG2%5FRL2/TSGR2%5F102/Docs [retrieved on May 11, 2018].

Nokia et al: "Paging in NR," 3GPP Draft; R1-1720883, 3rd Generation Partnership Project (3GPP), Mobile Competence Centre; 650, Route Des Lucioles; F-06921 Sophia-Antipolis Cedex; France, vol. RAN WG1, No. Reno, Nevada, USA; Nov. 27, 2017-Dec. 1, 2017, Nov. 17, 2017, XP051369105, 9 pages, Retrieved from the Internet: URL: http://www.3gpp.org/ftp/tsg%5Fran/WG1%5FRL1/TSGR1%5F91/Docs/ [retrieved on Nov. 17, 2017].

Qualcomm Incorporated: "Paging Design Consideration", 3GPP Draft; R1-1800849, 3rd Generation Partnership Project (3GPP), Mobile Competence Centre, 650, Route Des Lucioles, F-06921 Sophia-Antipolis Cedex, France, vol. RAN WG1, No. Vancouver, Canada; Jan. 22, 2018-Jan. 26, 2018 Jan. 13, 2018, XP051385121, Retrieved from the Internet: URL:http://www.3gpp.org/ftp/tsg%5Fran/WG1%5FRL1/TSGR1%5FAH/NR%5FAH%5F1801/Docs/ [retrieved on Jan. 13, 2018], 11 pages.

\* cited by examiner

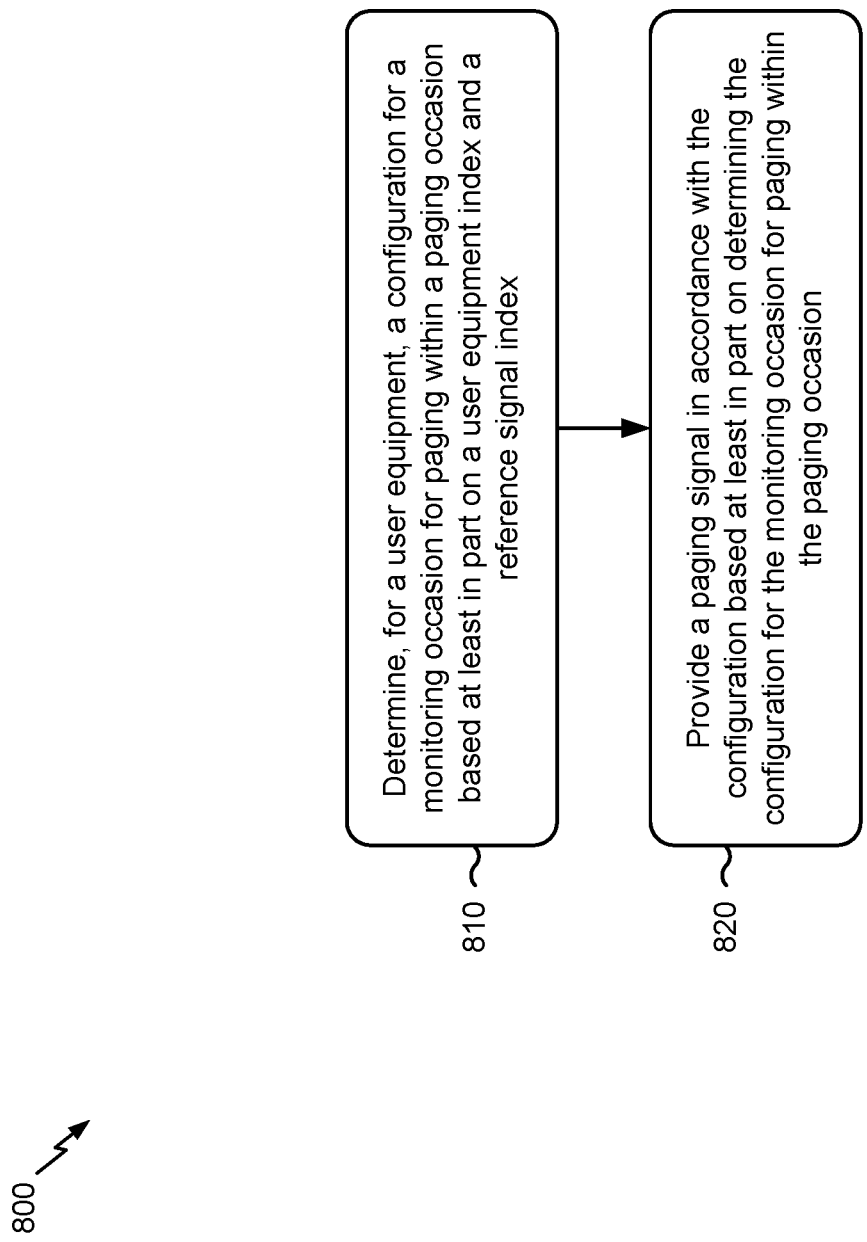

MONITORING OCCASION FOR PAGING DETERMINATION

CROSS-REFERENCE TO RELATED APPLICATIONS UNDER 35 U.S.C. § 119

This application is a continuation of U.S. patent application Ser. No. 16/242,791, filed Jan. 8, 2019, which claims priority to U.S. Provisional Patent Application No. 62/616,863, filed on Jan. 12, 2018, entitled "TECHNIQUES AND APPARATUSES FOR PAGING FRAME OCCASION DETERMINATION," which are hereby expressly incorporated by reference herein.

TECHNICAL FIELD OF THE DISCLOSURE

Aspects of the technology described below generally relate to wireless communication, and more particularly to techniques and apparatuses for management of monitoring occasions for paging determination. Embodiments and techniques enable and provide wireless communication devices and systems configured for low latency scenarios and enhance network coverage.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

BRIEF SUMMARY OF SOME EXAMPLES

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. The sole purpose of this summary is to present some concepts of one or more aspects of the disclosure in summary form as a prelude to the more detailed description that is presented later.

In some aspects, a method of wireless communication, performed by a base station, may include determining, for a user equipment, a configuration for a monitoring occasion for paging within a paging occasion based at least in part on a user equipment index and a reference signal index. The method may include providing a paging signal in accordance with the configuration based at least in part on determining the configuration for the monitoring occasion for paging within the paging occasion.

In some aspects, a base station for wireless communication may include memory and one or more processors operatively coupled to the memory. The memory and the one or more processors may be configured to determine, for a user equipment, a configuration for a monitoring occasion for paging within a paging occasion based at least in part on a user equipment index and a reference signal index. The memory and the one or more processors may be configured to provide a paging signal in accordance with the configuration based at least in part on determining the configuration for the monitoring occasion for paging within the paging occasion.

In some aspects, a non-transitory computer-readable medium may store one or more instructions for wireless communication. The one or more instructions, when executed by one or more processors of a base station, may cause the one or more processors to determine, for a user equipment, a configuration for a monitoring occasion for paging within a paging occasion based at least in part on a user equipment index and a reference signal index. The one or more instructions, when executed by the one or more processors of the base station, may cause the one or more processors to provide a paging signal in accordance with the configuration based at least in part on determining the configuration for the monitoring occasion for paging within the paging occasion.

In some aspects, an apparatus for wireless communication may include means for determining, for a user equipment, a configuration for a monitoring occasion for paging within a paging occasion based at least in part on a user equipment index and a reference signal index. The apparatus may include means for providing a paging signal in accordance with the configuration based at least in part on determining the configuration for the monitoring occasion for paging within the paging occasion.

In some aspects, a method of wireless communication may include determining, for a user equipment, a configuration for at least one of a paging frame, a paging occasion, or a monitoring window within the paging occasion based at least in part on a user equipment index and a reference signal index. The method may include providing a paging signal in accordance with the configuration based at least in part on determining the configuration for the at least one of the paging frame, the paging occasion, or the monitoring window within the paging occasion.

In some aspects, a base station for wireless communication may include memory and one or more processors operatively coupled to the memory. The memory and the one or more processors may be configured to determine, for a user equipment, a configuration for at least one of a paging frame, a paging occasion, or a monitoring window within the paging occasion based at least in part on a user equipment index and a reference signal index. The memory and the one or more processors may be configured to provide a paging signal in accordance with the configuration based at least in part on determining the configuration for the at least one of the paging frame, the paging occasion, or the monitoring window within the paging occasion.

In some aspects, a non-transitory computer-readable medium may store one or more instructions for wireless communication. The one or more instructions, when executed by one or more processors of a base station, may cause the one or more processors to determine, for a user equipment, a configuration for at least one of a paging frame, a paging occasion, or a monitoring window within the paging occasion based at least in part on a user equipment index and a reference signal index. The one or more instructions, when executed by the one or more processors of the base station, may cause the one or more processors to provide a paging signal in accordance with the configuration based at least in part on determining the configuration for the at least one of the paging frame, the paging occasion, or the monitoring window within the paging occasion.

In some aspects, an apparatus for wireless communication may include means for determining, for a user equipment, a configuration for at least one of a paging frame, a paging occasion, or a monitoring window within the paging occasion based at least in part on a user equipment index and a reference signal index. The apparatus may include means for providing a paging signal in accordance with the configuration based at least in part on determining the configuration for the at least one of the paging frame, the paging occasion, or the monitoring window within the paging occasion.

Aspects generally include a method, apparatus, device, computer program product, non-transitory computer-readable medium, user equipment, wireless communication device, base station, access point, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 8 is a diagram illustrating an example process performed, for example, by a base station, in accordance with various aspects of the present disclosure.

DETAILED DESCRIPTION

Figure 1:
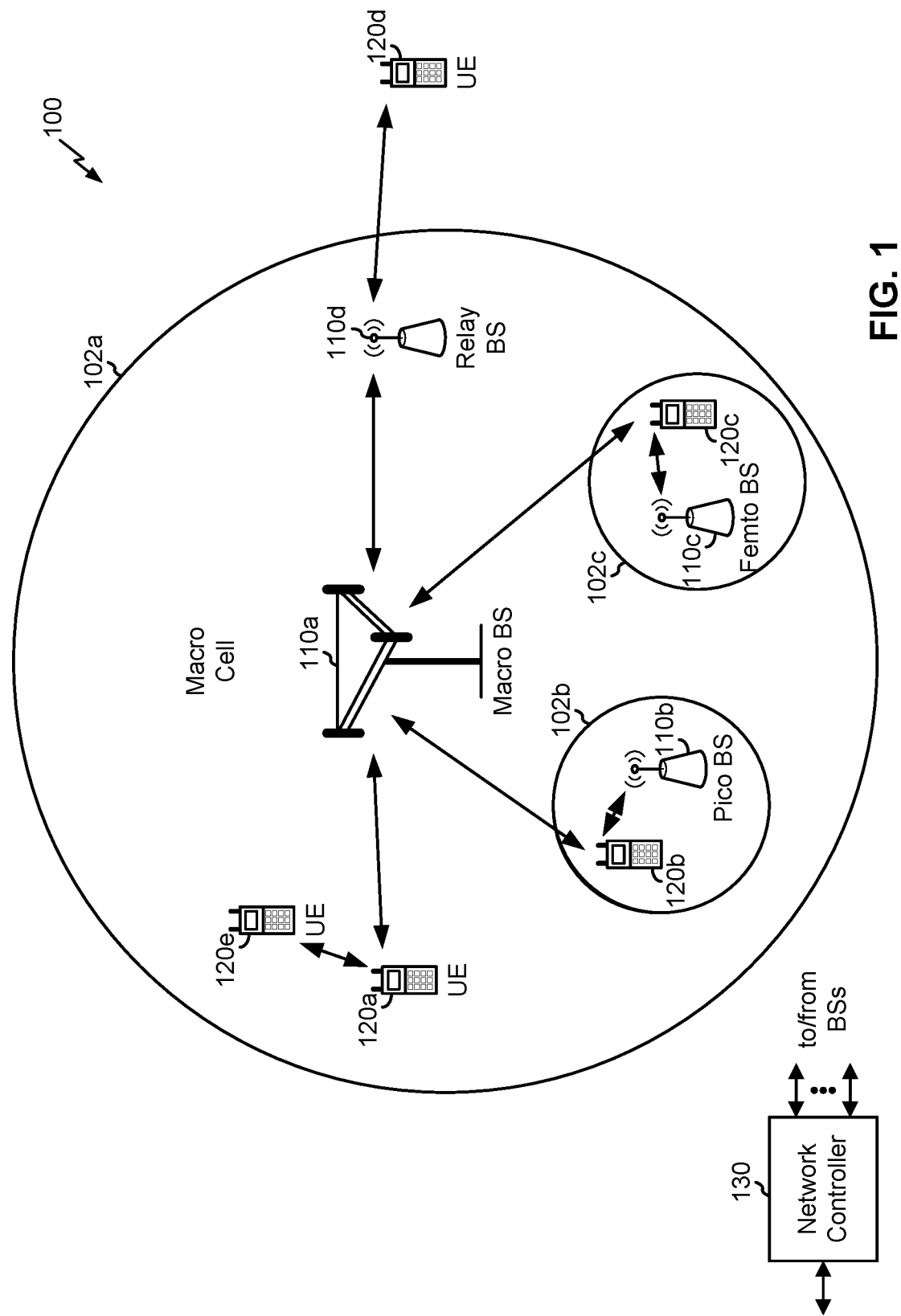
FIG. 1 is a block diagram conceptually illustrating an example of a wireless communication network, in accordance with various aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based at least in part on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and/or other non-module-component based devices (e.g., end-user devices, vehicles, communication devices, computing devices, industrial equipment, retail/purchasing devices, medical devices, AI-enabled devices, and/or the like). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes, and constitution.

FIG. 1 is a diagram illustrating a network 100 in which aspects of the present disclosure may be practiced. The network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided merely as an example. Other examples are possible and may differ from what was described with regard to FIG. 1.

Figure 2:
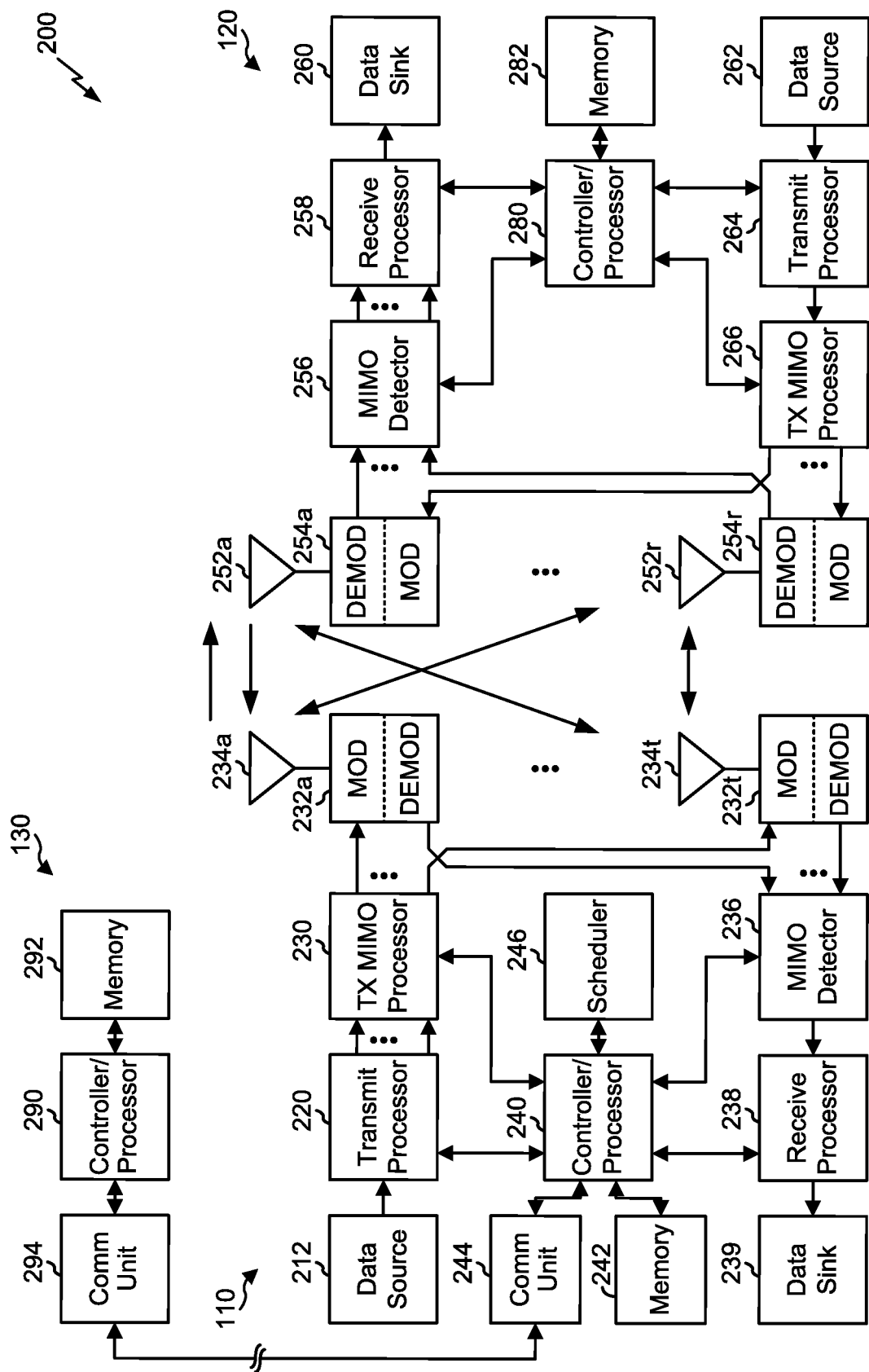
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

In some aspects, one or more components of UE 120 may be included in a housing. Controller/processor 240 of base station 110, controller/processor 280 of UE 120, and/or any other component(s) of FIG. 2 may perform one or more techniques associated with paging frame occasion determination, as described in more detail elsewhere herein. For example, controller/processor 240 of base station 110, controller/processor 280 of UE 120, and/or any other component(s) of FIG. 2 may perform or direct operations of, for example, process 800 of FIG. 8 and/or other processes as described herein. Memories 242 and 282 may store data and program codes for base station 110 and UE 120, respectively. A scheduler 246 may schedule UEs for data transmission on the downlink and/or uplink.

In some aspects, base station 110 may include means for determining, for a user equipment (e.g., UE 120), a configuration for a monitoring occasion for paging within a paging occasion based at least in part on a user equipment index and a reference signal index, means for providing a paging signal in accordance with the configuration based at least in part on determining the configuration for the monitoring occasion for paging within the paging occasion, and/or the like. In some aspects, such means may include one or more components of base station 110 described in connection with FIG. 2.

As indicated above, FIG. 2 is provided merely as an example. Other examples are possible and may differ from what was described with regard to FIG. 2.

Figure 3A:
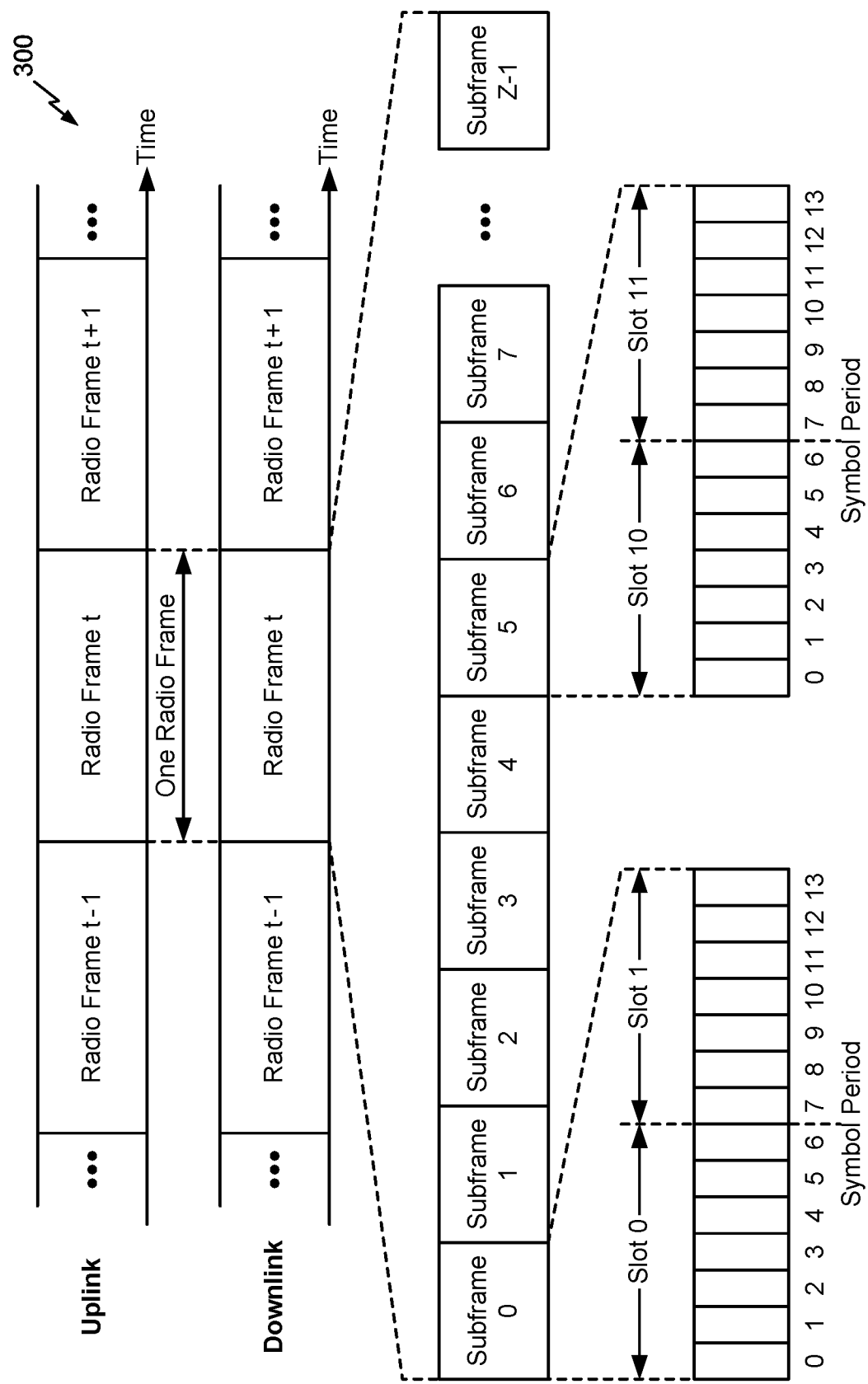
FIG. 3A is a block diagram conceptually illustrating an example of a frame structure in a wireless communication network, in accordance with various aspects of the present disclosure.

FIG. 3A shows an example frame structure 300 for FDD in a telecommunications system (e.g., NR). The transmission timeline for each of the downlink and uplink may be partitioned into units of radio frames. Each radio frame may have a predetermined duration and may be partitions into a set of $Z$ ($Z \geq 1$) subframes (e.g., with indices of 0 through Z-1). Each subframe may include a set of slots (e.g., two slots per subframe are shown in FIG. 3A). Each slot may include a set of L symbol periods. For example, each slot may include seven symbol periods (e.g., as shown in FIG. 3A), fifteen symbol periods, and/or the like. In a case where the subframe includes two slots, the subframe may include 2L symbol periods, where the 2L symbol periods in each subframe may be assigned indices of 0 through 2L-1. In some aspects, a scheduling unit for the FDD may frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
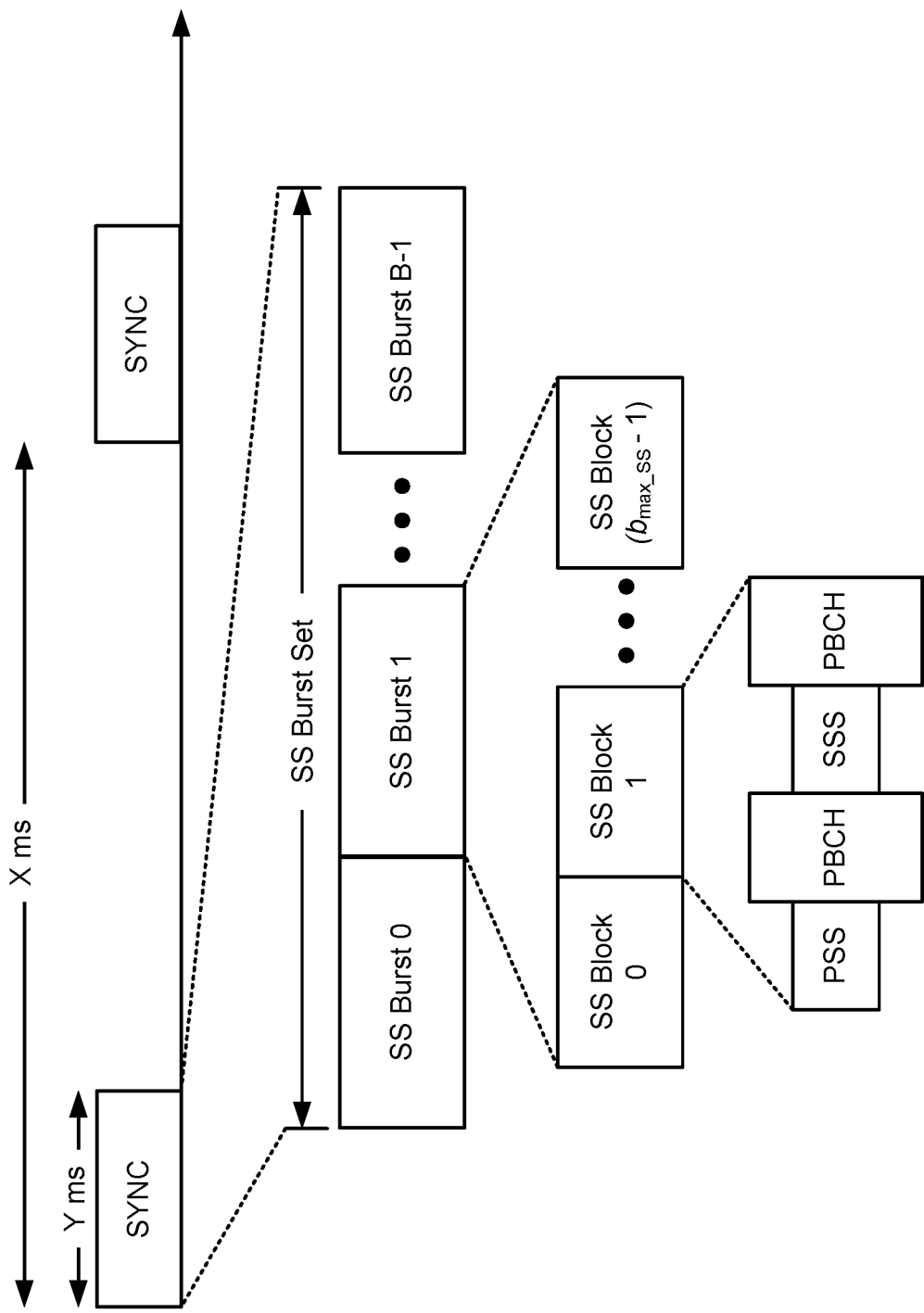
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B-1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more subframes. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain subframes. The base station may transmit control information/data on a physical downlink control channel (PDCCH) in C symbol periods of a subframe, where B may be configurable for each subframe. The base station may transmit traffic data and/or other data on the PDSCH in the remaining symbol periods of each subframe.

As indicated above, FIGS. 3A and 3B are provided as examples. Other examples are possible and may differ from what was described with regard to FIGS. 3A and 3B.

Figure 4:
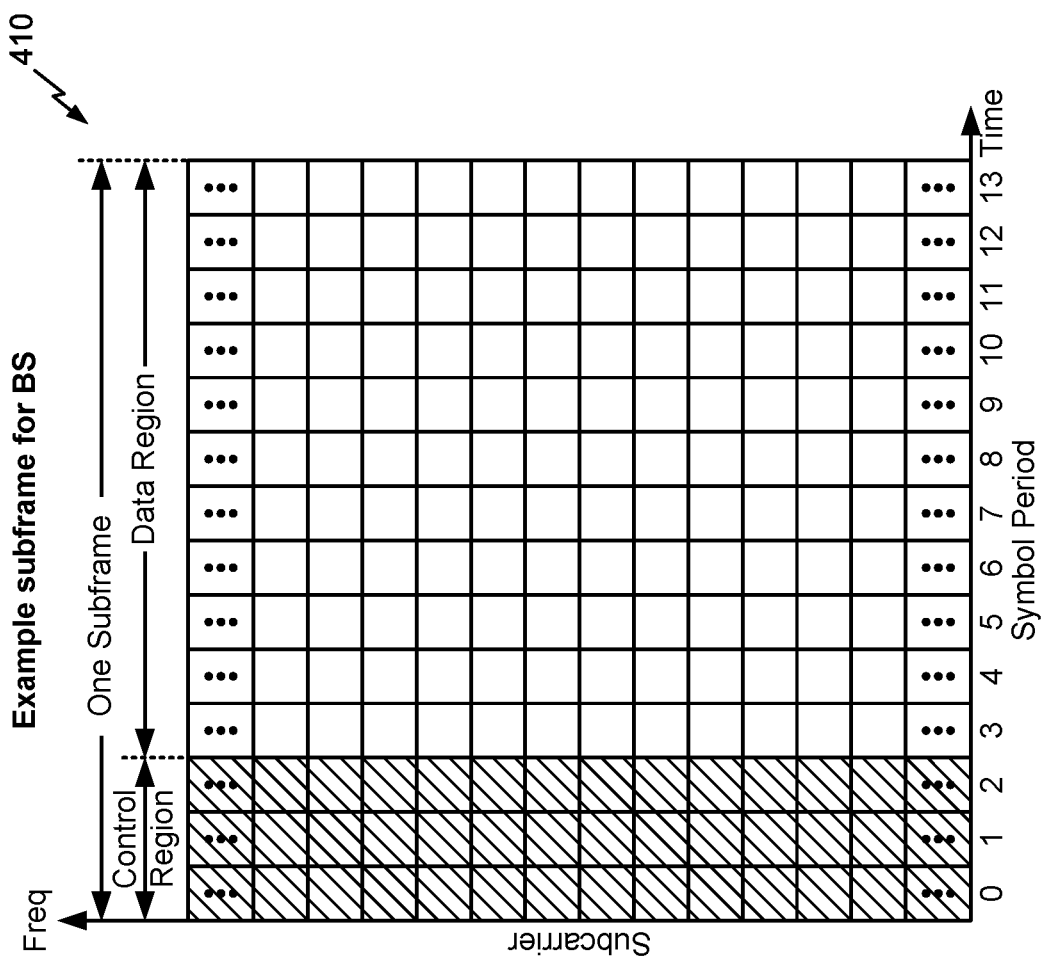
FIG. 4 is a block diagram conceptually illustrating an example subframe format with a normal cyclic prefix, in accordance with various aspects of the present disclosure.

FIG. 4 shows an example subframe format 410 with a normal cyclic prefix. The available time frequency resources may be partitioned into resource blocks. Each resource block may cover a set to of subcarriers (e.g., 12 subcarriers) in one slot and may include a number of resource elements. Each resource element may cover one subcarrier in one symbol period (e.g., in time) and may be used to send one modulation symbol, which may be a real or complex value. In some aspects, subframe format 410 may be used for transmission of SS blocks that carry the PSS, the SSS, the PBCH, and/or the like, as described herein.

An interlace structure may be used for each of the downlink and uplink for FDD in certain telecommunications systems (e.g., NR). For example, Q interlaces with indices of 0 through Q-1 may be defined, where Q may be equal to 4, 6, 8, 10, or some other value. Each interlace may include subframes that are spaced apart by Q frames. In particular, interlace q may include subframes q, q+Q, q+2Q, etc., where $q \in \{0, \ldots, Q-1\}$.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHZ may be supported. NR resource blocks may span 12 sub-carriers with a sub-carrier bandwidth of 60 or 120 kilohertz (kHz) over a 0.1 millisecond (ms) duration. Each radio frame may include 40 subframes with a length of 10 ms. Consequently, each subframe may have a length of 0.25 ms. Each subframe may indicate a link direction (e.g., DL or UL) for data transmission and the link direction for each subframe may be dynamically switched. Each subframe may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples are possible and may differ from what was described with regard to FIG. 4.

Figure 5:
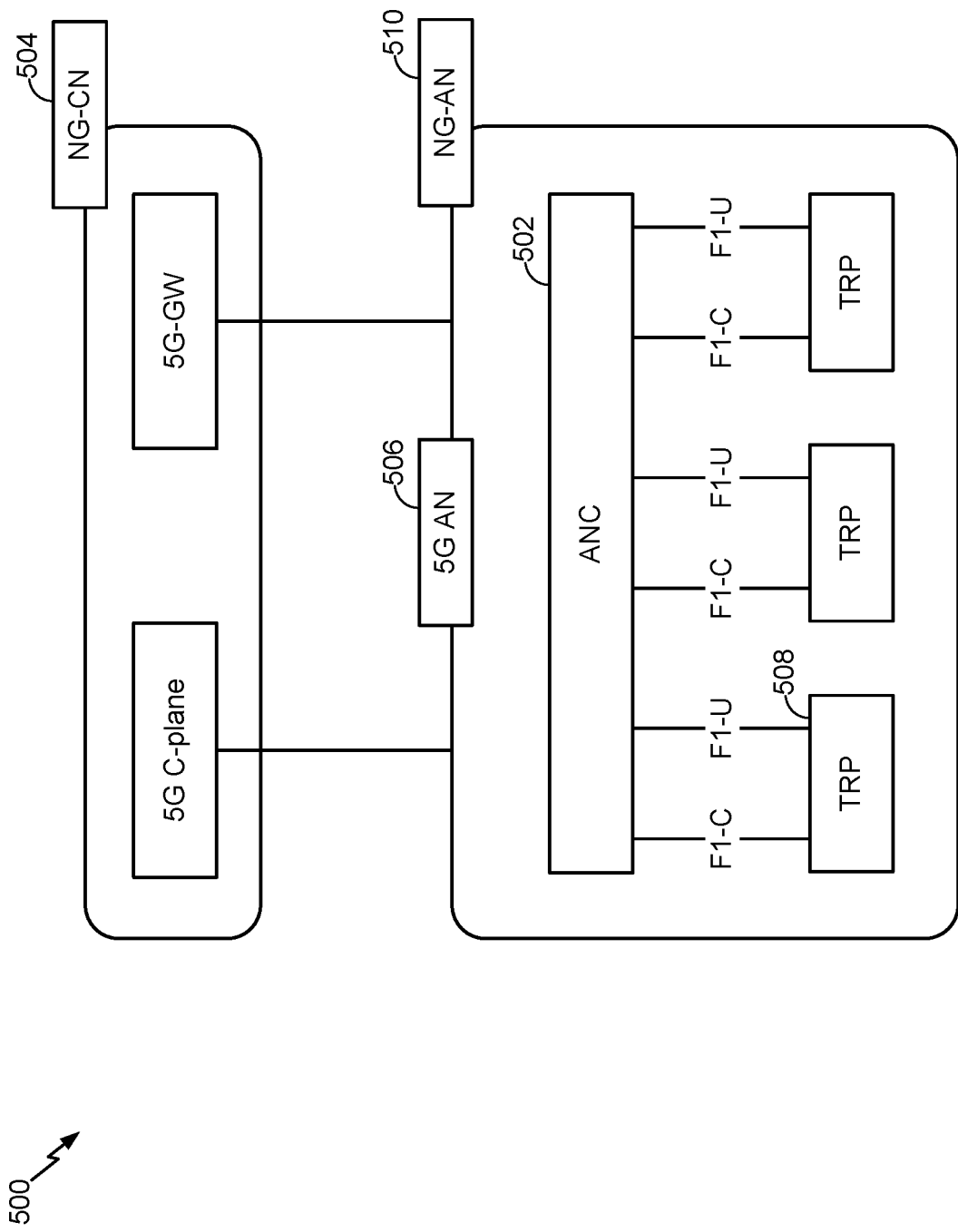
FIG. 5 illustrates an example logical architecture of a distributed radio access network (RAN), in accordance with various aspects of the present disclosure.

FIG. 5 illustrates an example logical architecture of a distributed RAN 500, according to aspects of the present disclosure. A 5G access node 506 may include an access node controller (ANC) 502. The ANC may be a central unit (CU) of the distributed RAN 500. The backhaul interface to the next generation core network (NG-CN) 504 may terminate at the ANC. The backhaul interface to neighboring next generation access nodes (NG-ANs) may terminate at the ANC. The ANC may include one or more TRPs 508 (which may also be referred to as BSs, NR BSs, Node Bs, 5G NBs, APs, gNB, or some other term). As described above, a TRP may be used interchangeably with "cell."

The TRPs 508 may be a distributed unit (DU). The TRPs may be connected to one ANC (ANC 502) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture of RAN 500 may be used to illustrate fronthaul definition. The architecture may be defined that support fronthauling solutions across different deployment types. For example, the architecture may be based at least in part on transmit network capabilities (e.g., bandwidth, latency, and/or jitter).

The architecture may share features and/or components with LTE. According to aspects, the next generation AN (NG-AN) 510 may support dual connectivity with NR. The NG-AN may share a common fronthaul for LTE and NR.

The architecture may enable cooperation between and among TRPs 508. For example, cooperation may be preset within a TRP and/or across TRPs via the ANC 502. According to aspects, no inter-TRP interface may be needed/present.

According to aspects, a dynamic configuration of split logical functions may be present within the architecture of RAN 500. The packet data convergence protocol (PDCP), radio link control (RLC), media access control (MAC) protocol may be adaptably placed at the ANC or TRP.

According to various aspects, a BS may include a central unit (CU) (e.g., ANC 502) and/or one or more distributed units (e.g., one or more TRPs 508).

As indicated above, FIG. 5 is provided merely as an example. Other examples are possible and may differ from what was described with regard to FIG. 5.

Figure 6:
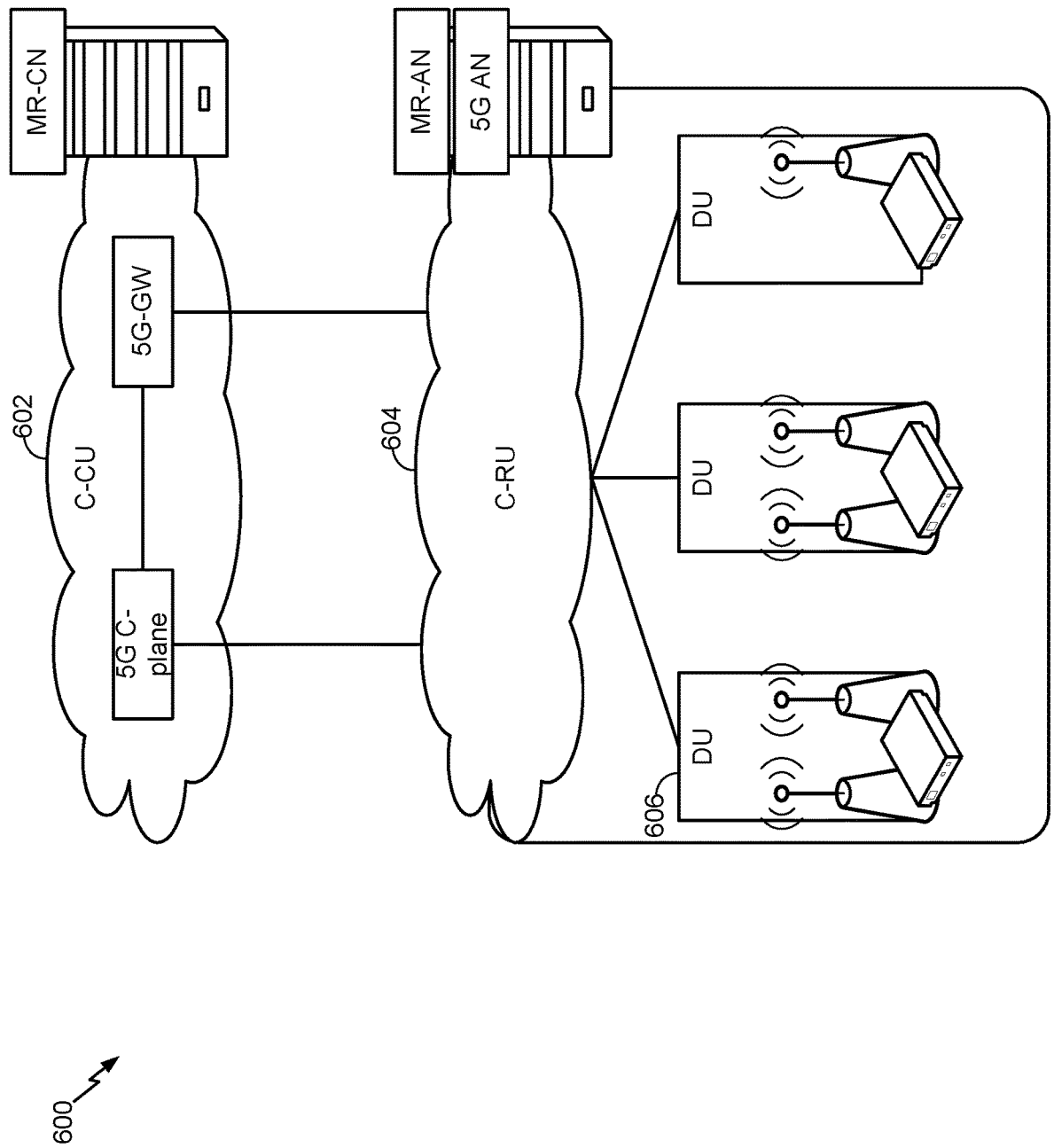
FIG. 6 illustrates an example physical architecture of a distributed RAN, in accordance with various aspects of the present disclosure.

FIG. 6 illustrates an example physical architecture of a distributed RAN 600, according to aspects of the present disclosure. A centralized core network unit (C-CU) 602 may host core network functions. The C-CU may be centrally deployed. C-CU functionality may be offloaded (e.g., to advanced wireless services (AWS)), in an effort to handle peak capacity.

A centralized RAN unit (C-RU) 604 may host one or more ANC functions. Optionally, the C-RU may host core network functions locally. The C-RU may have distributed deployment. The C-RU may be closer to the network edge.

A distributed unit (DU) 606 may host one or more TRPs. The DU may be located at edges of the network with radio frequency (RF) functionality.

As indicated above, FIG. 6 is provided merely as an example. Other examples are possible and may differ from what was described with regard to FIG. 6.

A BS may provide a paging signal to a UE to cause the UE to transfer from an idle state to another state, and receive data from the BS. In some communications systems, such as LTE and/or the like, a resource allocation for a paging frame and a paging occasion associated with the paging frame may be determined based at least in part on a user equipment index associated with a UE. A BS may determine a configuration for a transmission window for a paging downlink control information (DCI) message or a paging message, and may transmit one or more paging DCI messages or paging messages during the transmission window. However, in other communications systems, such as 5G or NR, SS blocks (which may be termed SSBs) may be defined for an SS burst set, as described herein. Moreover, a remaining minimum system information (RMSI) control resource set (CORESET) monitoring window may be defined for a synchronization signal block of a synchronization signal burst set.

Some aspects, described herein, may enable improved paging frame occasion determination. For example, a BS may determine a paging frame, a paging occasion, a monitoring window for the paging occasion, and/or the like based at least in part on a user equipment index and a reference signal index, such as an SS block index. In this way, the BS enables paging occasions for UEs operating in a communications system that uses SS blocks. Moreover, in some aspects, described herein, the BS may provide information identifying the configuration using an RMSI message, an other system information (OSI) message, a radio resource control (RRC) connected message, and/or the like. In this way, the BS leverages the RMSI message, the OSI message, the RRC connected message, and/or the like to provide the configuration information, thereby reducing a utilization of network resources relative to providing dedicated signaling. Moreover, based at least in part on using a statically defined relationship between the reference signal index and the monitoring window for the paging occasion, the BS enables, in some aspects, paging without transmission of configuration information.

Figure 7:
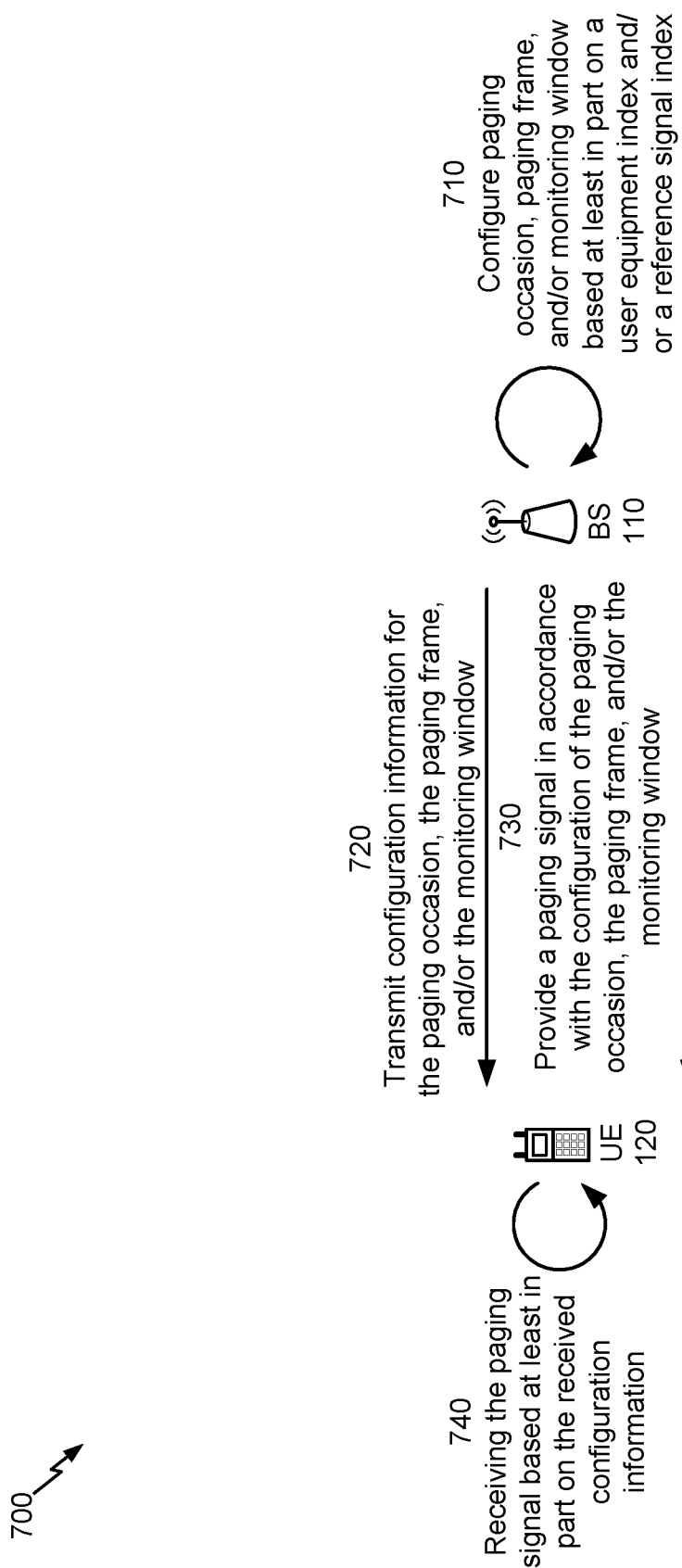
FIG. 7 is a diagram illustrating an example of paging frame occasion determination, in accordance with various aspects of the present disclosure.

FIG. 7 is a diagram illustrating an example 700 of paging frame occasion determination, in accordance with various aspects of the present disclosure. As shown in FIG. 7, example 700 includes a BS 110 and a UE 120.

As further shown in FIG. 7, and by reference number 710, BS 110 may configure a paging occasion, a paging frame, a monitoring window within the paging occasion, and/or the like based at least in part on a user equipment index, a reference signal index, and/or the like. For example, BS 110 may configure a dependency between the paging occasion and the paging frame based at least in part on a user equipment index associated with UE 120 and reference signal index (e.g., a synchronization signal block (SSB) index).

In some aspects, the monitoring window within the paging occasion is associated with a reference signal corresponding to the reference signal index. For example, the monitoring window within the paging occasion may be associated with monitoring for an SSB associated with the SSB index. In some aspects, the reference signal may be a particular type of signal. For example, the reference signal may be a synchronization signal, a tracking reference signal, a mobility reference signal, a channel state information reference signal (CSI-RS), and/or the like. In this case, when the reference signal is, for example, the synchronization signal, the reference signal may be a primary synchronization signal, a second synchronization signal, a physical broadcast channel (PBCH) signal, a demodulation reference signal of a PBCH, and/or the like.

In some aspects, BS 110 and UE 120 may use a preconfigured value for the dependency between the paging occasion and the paging frame and the SSB index. For example, the preconfigured value for the dependency and another value for another dependency between an RMSI monitoring window and the SSB index may be a common value and/or may be determined based at least in part on one or more common parameters, such as a quantity of slots per frame parameter, an SCS parameter, a numerology parameter, a search space sets per slot parameter, a discontinuous reception (DRX) parameter, and/or the like. In some aspects, the preconfigured value for the dependency and the other value for the other dependency may be different values. For example, the dependencies may be different values when BS 110 configures the paging occasion and transmits configuration information identifying the configuration for the paging occasion. In some aspects, the RMSI monitoring window is associated with an RMSI grant corresponding to the reference signal index (e.g., the SSB index).

In some aspects, BS 110 may determine the paging frame, the paging occasion, and/or a paging narrowband (PNB) based at least in part on one or more DRX parameters associated with system information (SI). For example, the paging frame, the paging occasion, the PNB, and/or the like may be determined based at least in part on one or more system information DRX parameters and the SSB index. In some aspects, BS 110 may determine the paging frame, the paging occasion, and/or the PNB based at least in part on a quantity of slots per frame in an RMSI numerology, a quantity of search space sets per slot, and/or the like.

In some aspects, BS 110 may determine the paging occasion within the paging frame based at least in part on the SSB index and not based at least in part on the user equipment index. In some aspects, BS 110 may determine a configuration for a combination of the paging frame, the paging occasion, and/or the monitoring window within the paging occasion based at least in part on the reference signal index. In some aspects, the reference signal corresponding to the reference signal index may be included in a burst set, such as an SS burst set.

In some aspects, BS 110 may determine a single paging occasion for a particular paging frame. In some aspects, BS 110 may determine to include a paging DCI and a paging message in a single period (e.g., a single 20 millisecond (ms) window). In this case, a radio frame within the single period may be determined based at least in part on an SSB index. In some aspects, BS 110 may determine a slot index of a subframe for UE 120 to monitor for the paging DCI. For example, BS 110 may determine the slot index based at least in part on the SSB index. In some aspects, a plurality of UEs 120 may be configured to monitor a common slot for a paging DCI. For example, the plurality of UEs 120 may determine a common SSB, and may determine to monitor the common slot based at least in part on the common SSB. In this case, BS 110 may configure a paging signal for the common slot, and may provide a paging signal in the common slot. In some aspects, each SSB in an SS burst set may be associated with a monitoring window within a paging occasion.

As further shown in FIG. 7, and by reference number 720, BS 110 may transmit configuration information for the paging occasion, the paging frame, the monitoring window, and/or the like. For example, BS 110 may provide the configuration information using an RMSI message, a broadcast OSI message, an RRC connected message, and/or the like. In some aspects, BS 110 may provide configuration information indicating one or more of the paging occasion, the paging frame, the monitoring window within the paging occasion, and/or the like. In this case, UE 120 may determine to monitor for a paging signal based at least in part on the configuration information. In some aspects, BS 110 may not provide configuration information indicating the paging occasion. For example, BS 110 may determine the configuration for the paging occasion, the paging frame, the monitoring window within the paging occasion, and/or the like, and UE 120 may, concurrently, determine the configuration for the paging occasion, the paging frame, the monitoring window within the paging occasion, and/or the like based at least in part on preconfigured, stored information.

As further shown in FIG. 7, and by reference number 730, BS 110 may provide a paging signal in accordance with the configuration of the paging occasion, the paging frame, the monitoring window within the paging occasion, and/or the like. For example, BS 110 may transmit the paging signal using a resource allocated in accordance with the configuration of the paging occasion, the paging frame, the monitoring window, and/or the like. In some aspects, BS 110 may transmit a DCI message in accordance with the configuration. In some aspects, BS 110 may transmit a paging message in accordance with the configuration. In some aspects, BS 110 may convey a paging grant for UE 120 in connection with the paging frame, the paging occasion, and/or the monitoring window. For example, BS 110 may convey the paging grant using a physical downlink control channel associated with providing the paging signal.

As further shown in FIG. 7, and by reference number 740, based at least in part on BS 110 providing the paging signal, UE 120 may receive the paging signal using the received configuration information. For example, UE 120 may receive the paging signal, such as a DCI message, a paging message, and/or the like using the configuration information. In this case, UE 120 may use the configuration information to determine a resource allocation for the paging signal, and may monitor the resource allocation to receive the paging signal. Additionally, or alternatively, UE 120 may use a preconfigured value to determine the resource allocation for receiving the paging signal, and may receive the paging signal.

As indicated above, FIG. 7 is provided as an example. Other examples are possible and may differ from what was described with respect to FIG. 7.

FIG. 8 is a diagram illustrating an example process 800 performed, for example, by a BS, in accordance with various aspects of the present disclosure. Example process 800 is an example where a BS (e.g., BS 110) performs paging frame occasion determination. In some aspects, one or more parts of process 800 may be performed by a UE (e.g., UE 120), such as when a UE communicates with another UE.

As shown in FIG. 8, in some aspects, process 800 may include determining, for a user equipment (e.g., UE 120), a configuration for a monitoring occasion for paging within a paging occasion based at least in part on a user equipment index and a reference signal index (block 810). For example, the BS may determine (e.g., using transmit processor 220, controller/processor 240, and/or the like) a configuration for a monitoring occasion for paging within a paging occasion based at least in part on a user equipment index and a reference signal index, as described in more detail above.

As shown in FIG. 8, in some aspects, process 800 may include providing a paging signal in accordance with the configuration based at least in part on determining the configuration for the monitoring occasion for paging within the paging occasion (block 820). For example, the BS may provide (e.g., using transmit processor 220, TX MIMO processor 230, modulator 232, antenna 234 and/or the like) a paging signal in accordance with the configuration based at least in part on determining the configuration for the monitoring occasion for paging within the paging occasion, as described in more detail above.

Process 800 may include additional aspects, such as any single aspect and/or any combination of aspects described below and/or in connection with one or more other processes described elsewhere herein.

In some aspects, the reference signal index is associated with a reference signal within a reference signal burst set. In some aspects, the BS may determine the configuration for at least one of a paging frame that contains the paging occasion or the paging occasion. In some aspects, the monitoring occasion for paging is a physical downlink channel (PDCCH) monitoring occasion for paging. In some aspects, information identifying the configuration is provided using a remaining minimum system information (RMSI) or another system information (OSI) message. In some aspects, a reference signal corresponding to the reference signal index is included in a synchronization signal block.

In some aspects, the synchronization signal block includes at least one of: a primary synchronization signal, a secondary synchronization signal, a physical broadcast channel, a demodulation reference signal of the physical broadcast channel, or a combination thereof. In some aspects, the reference signal index is a synchronization signal block (SSB) index. In some aspects, the BS may provide, before providing the paging signal, information identifying the configuration for the monitoring occasion for paging within the paging occasion.

In some aspects, information identifying the configuration is provided within another paging occasion or the paging occasion. In some aspects, a first dependency between the reference signal index and the monitoring occasion for paging within the paging occasion corresponds to a second dependency between the reference signal index and another monitoring occasion of a remaining minimum system information (RMSI) control resource set (CORESET). In some aspects, the first dependency relates to a search space for paging and the second dependency relates to a search space for the RMSI.

In some aspects, the other monitoring occasion of the RMSI CORESET includes an RMSI grant corresponding to the reference signal index. In some aspects, the monitoring occasion for paging within the paging occasion conveys a paging grant for the user equipment. In some aspects, the paging grant is conveyed by a physical downlink control channel.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The foregoing disclosure provides illustration and description, but is not intended to be exhaustive or to limit the aspects to the precise form disclosed. Modifications and variations are possible in light of the above disclosure or may be acquired from practice of the aspects.

As used herein, the term component is intended to be broadly construed as hardware, firmware, or a combination of hardware and software. As used herein, a processor is implemented in hardware, firmware, or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods, described herein, may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of possible aspects. In fact, many of these features may be combined in ways not specifically recited in the claims and/or disclosed in the specification. Although each dependent claim listed below may directly depend on only one claim, the disclosure of possible aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the term "one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment, comprising:
monitoring for a paging signal based at least in part on a configuration for a monitoring occasion for paging within a paging occasion,
the configuration being based at least in part on a synchronization signal block (SSB) index for a SSB,
the SSB index identifying the SSB within a synchronization signal burst, and
a first dependency between the SSB index and the monitoring occasion for paging within the paging occasion corresponding to a second dependency between the SSB index and another monitoring occasion of a remaining minimum system information (RMSI) control resource set (CORESET); and
receiving the paging signal based at least in part on monitoring for the paging signal.

2. The method of claim 1, wherein the monitoring occasion for paging is a physical downlink channel (PDCCH) monitoring occasion for paging.

3. The method of claim 1, wherein the SSB includes at least one of:
a primary synchronization signal,
a secondary synchronization signal,
a physical broadcast channel,
a demodulation reference signal of the physical broadcast channel, or
a combination thereof.

4. The method of claim 1, further comprising:
receiving, before receiving the paging signal, information identifying the configuration for the monitoring occasion for paging within the paging occasion.

5. The method of claim 1, further comprising:
receiving information identifying the configuration within another paging occasion or the paging occasion.

6. The method of claim 1, further comprising:
receiving information identifying the configuration using the RMSI or another system information (OSI) message.

7. The method of claim 1, wherein the first dependency relates to a search space for paging and the second dependency relates to a search space for the RMSI.

8. The method of claim 1, wherein the other monitoring occasion of the RMSI CORESET includes an RMSI grant corresponding to the SSB index.

9. The method of claim 1, wherein the monitoring occasion for paging within the paging occasion conveys a paging grant for the user equipment.

10. The method of claim 9, wherein the paging grant is conveyed by a physical downlink control channel.

11. A user equipment for wireless communication, comprising:
a memory;
one or more processors coupled to the memory; and
instructions stored in the memory and operable, when executed by the one or more processors to cause the user equipment to:
monitor for a paging signal based at least in part on a configuration for a monitoring occasion for paging within a paging occasion,
the configuration being based at least in part on a synchronization signal block (SSB) index for a SSB,
the SSB index identifying the SSB within a synchronization signal burst, and
a first dependency between the SSB index and the monitoring occasion for paging within the paging occasion corresponding to a second dependency between the SSB index and another monitoring occasion of a remaining minimum system information (RMSI) control resource set (CORESET); and receive the paging signal based at least in part on monitoring for the paging signal.

12. The user equipment of claim 11, wherein the monitoring occasion for paging is a physical downlink channel (PDCCH) monitoring occasion for paging.

13. The user equipment of claim 11, wherein the SSB includes at least one of:
a primary synchronization signal,
a secondary synchronization signal,
a physical broadcast channel,
a demodulation reference signal of the physical broadcast channel, or
a combination thereof.

14. The user equipment of claim 11, wherein the one or more processors further cause the user equipment to:
receive, before receiving the paging signal, information identifying the configuration for the monitoring occasion for paging within the paging occasion.

15. The user equipment of claim 11, wherein the one or more processors further cause the user equipment to
receive information identifying the configuration within another paging occasion or the paging occasion.

16. The user equipment of claim 11, wherein the one or more processors further cause the user equipment to:
receive information identifying the configuration using the RMSI or another system information (OSI) message.

17. The user equipment of claim 11, wherein the first dependency relates to a search space for paging and the second dependency relates to a search space for the RMSI.

18. The user equipment of claim 11, wherein the other monitoring occasion of the RMSI CORESET includes an RMSI grant corresponding to the SSB index.

19. The user equipment of claim 11, wherein the monitoring occasion for paging within the paging occasion conveys a paging grant for the user equipment.

20. The user equipment of claim 19, wherein the paging grant is conveyed by a physical downlink control channel.

21. The user equipment of claim 11, wherein the configuration is further based on a user equipment index.

22. A non-transitory computer-readable medium storing one or more instructions for wireless communication that, when executed by one or more processors of a user equipment cause the user equipment to:
monitor for a paging signal based at least in part on a configuration for a monitoring occasion for paging within a paging occasion,
the configuration being based at least in part on a synchronization signal block (SSB) index for a SSB,
the SSB index identifying the SSB within a synchronization signal burst, and
a first dependency between the SSB index and the monitoring occasion for paging within the paging occasion corresponding to a second dependency between the SSB index and another monitoring occasion of a remaining minimum system information (RMSI) control resource set (CORESET); and
receive the paging signal based at least in part on monitoring for the paging signal.

23. The non-transitory computer-readable medium of claim 22, wherein the monitoring occasion for paging is a physical downlink channel (PDCCH) monitoring occasion for paging.

24. The non-transitory computer-readable medium of claim 22, wherein the SSB includes at least one of:
a primary synchronization signal,
a secondary synchronization signal,
a physical broadcast channel,
a demodulation reference signal of the physical broadcast channel, or
a combination thereof.

25. The non-transitory computer-readable medium of claim 22, wherein the first dependency relates to a search space for paging and the second dependency relates to a search space for the RMSI.

26. The non-transitory computer-readable medium of claim 22, wherein the other monitoring occasion of the RMSI CORESET includes an RMSI grant corresponding to the SSB index.

27. An apparatus for wireless communication, comprising:
means for monitoring for a paging signal based at least in part on a configuration for a monitoring occasion for paging within a paging occasion,
the configuration being based at least in part on a synchronization signal block (SSB) index for a SSB,
the SSB index identifying the SSB within a synchronization signal burst, and
a first dependency between the SSB index and the monitoring occasion for paging within the paging occasion corresponding to a second dependency between the SSB index and another monitoring occasion of a remaining minimum system information (RMSI) control resource set (CORESET); and
means for receiving the paging signal based at least in part on monitoring for the paging signal.

28. The apparatus of claim 27, wherein the monitoring occasion for paging is a physical downlink channel (PDCCH) monitoring occasion for paging.

29. The apparatus of claim 27, wherein the SSB includes at least one of:
a primary synchronization signal,
a secondary synchronization signal,
a physical broadcast channel,
a demodulation reference signal of the physical broadcast channel, or
a combination thereof.

30. The apparatus of claim 27, wherein the first dependency relates to a search space for paging and the second dependency relates to a search space for the RMSI.

31. The apparatus of claim 27, wherein the other monitoring occasion of the RMSI CORESET includes an RMSI grant corresponding to the SSB index.

* * * * *